United States Patent [19]

Flammini

[11] 4,380,882
[45] Apr. 26, 1983

[54] LONG LIFE PURSE SEINE RING

[76] Inventor: Dominick J. Flammini, 7946 Laurelridge Rd., San Diego, Calif. 92120

[21] Appl. No.: 345,613

[22] Filed: Feb. 3, 1982

[51] Int. Cl.³ .............................................. A01K 73/12
[52] U.S. Cl. .......................................... 43/14; 294/77
[58] Field of Search ...................... 43/6.5, 8, 9, 11, 12, 43/14, 42.74, 44.83, 44.84, 44.85, 44.86, 44.87; 254/389; 294/77

[56] References Cited

U.S. PATENT DOCUMENTS

| 2,908,989 | 10/1959 | Povinelli et al. | 43/42.74 |
| 3,064,384 | 10/1962 | Lewis et al. | 43/14 |
| 3,158,951 | 12/1964 | Lewis et al. | 43/14 X |
| 4,171,586 | 10/1979 | Hendricks | 43/14 X |

FOREIGN PATENT DOCUMENTS

| 26443 | 5/1931 | Australia | 43/7 |
| 528923 | 11/1940 | United Kingdom | 43/9 |
| 622604 | 5/1949 | United Kingdom | 43/9 |
| 642852 | 9/1950 | United Kingdom | 43/9 |
| 726292 | 3/1955 | United Kingdom | 43/9 |

Primary Examiner—Nicholas P. Godici
Assistant Examiner—M. Jordan
Attorney, Agent, or Firm—Knox & Knox

[57] ABSTRACT

A seine ring for use, in plurality, on the lower edge of a purse seine net which is conventionally closed or pursed by a pursing cable threaded through the rings. The seine ring is adapted for quick, easy and positive attachment to the seine net, ordinarily by a ring tie of any suitable kind and generally with a bridle on the net, with the seine ring according to this invention capable of being oriented in a number of different positions to distribute the wear of the cable on the seine ring. The ring is essentially a hollow cylindrical element or annulus with an integral radially extending portion or flange, the annulus presenting an extensive wear surface to the cable and the flange reinforcing the annulus against deformation, and more importantly, providing for progressive placement of the ring tie on the seine ring to assure positive orientation of the seine ring in the above mentioned number of positions, the flange having an uneven number of equally spaced apertures into which a ring tie can be secured selectively and successively.

5 Claims, 3 Drawing Figures

LONG LIFE PURSE SEINE RING

BACKGROUND OF THE INVENTION

In seine net fishing as practiced on a commercial basis the long open bottomed net is displayed with supporting floats around a school of fish and then pursed or closed at the bottom by a pursing cable, threaded prior to the setting of the net through purse rings fastened usually by bridles to the bottom edge of the net, the cable being drawn by winch means on the fishing boat. Since the heavy rings and net, added to the weight of the catch of fish may represent many tons of weight, there is great friction generated between the rings and cable with the result that the rings are worn away by the twisted steel cable and the wear tends to be quite localized on these prior art rings which are regularly of simple annular form with a circular cross section and the localization of wear is promoted exponentially by the tendency of these prior art rings to deform into oval shape as a result of weakening at the points of wear. It is common practice to repair worn rings but there is a need for rings of more extended useful life and with less need for frequent reforming and repair.

SUMMARY OF THE INVENTION

As claimed the hereindisclosed seine ring represents an adequate response to the immediately abovementioned need, this improved ring comprising a hollow recticylindrical annulus to receive the pursing cable and present a larger, wider wear surface to the cable, with a circumferential flange to prevent deformation of the ring in use, and this flange has means for connection thereof to the net, ordinarily by bridles which are standard equipment, in a plurality of positions, the simplest being that illustrated a plurality of apertures circumferentially spaced around the flange allowing the ring to be oriented in an equal plurality of positions so that the wear of the pursing cable can be distributed simply by tying the ring at a different position to distribute the wear around the ring.

DETAILED DESCRIPTION OF A PREFERRED EMBODIMENT

Figure 2:
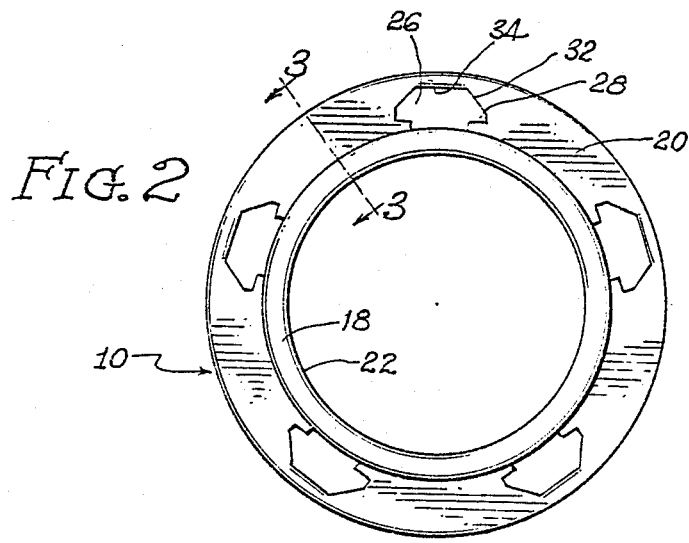
FIG. 2 is a similar view of the ring above.

Referring now to the drawing wherein like numerals refer to like or identical parts and portions in the different views, this seine ring, generally indicated by its numeral 10, is designed to be connected to a net, not illustrated, by a ring tie such as that illustrated at 12 which in turn may be connected by a split link 14 to a bridle on the bottom edge of the net such as that fragmentarily illustrated at 16. The environment wherewith this ring is used may vary considerably without significant variation in the ring itself.

Figure 3:
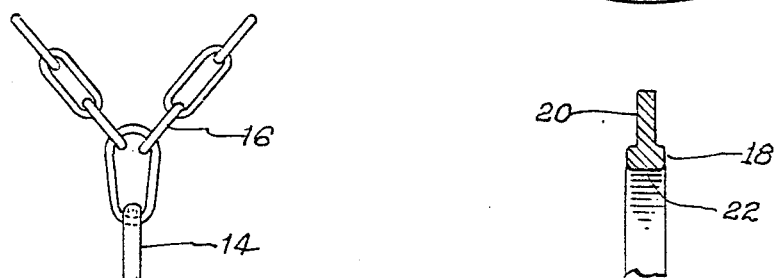
FIG. 3 is a cross sectional view of the ring taken on the line 3—3 in FIG. 2.

The ring 10 is shown as of one-piece construction and must of course be sturdy and ordinarily of iron, the considerable weight thereof having utility in ballasting the net to hang vertically below the floats which are standard equipment on the top edge of the net, thought unnecessary to be described herein. Although of one-piece construction, the ring 10 can be considered as comprising a hollow cylindrical annulus 18 and an external radially extending flange 20. The annulus 18 is represented as being substantially internally recticylindrical as shown best in FIG. 3, and presents a cable-contacting inner face indicated at 22 which although annular is flat in the direction parallel the principal axis of the ring to provide maximum wear surface for the pursing cable 24, this feature being an advantage over the conventional ring which is circular in cross-section. It has been proposed that rings be made with specially treated internal facings and this can be incorporated into the instant ring as desired.

Externally of the annulus 18 the sturdy peripheral flange 20 has two prime functions, firstly the prevention of deformation of the ring into oval form as experienced in prior art rings due to the very heavy loading applied by the cable 24 especially during the haul-in of a loaded net; and secondly, the provision of plural ring connecting means in the flange 20. This connecting means may take the simple form shown, namely peripherally spaced apertures 26. Five such apertures are shown, to be used one at a time to accommodate a ring tie 12 or the like whereby the ring is connected, usually indirectly, to the net. It will be noted that the pursing cable is shown at a location diametrically opposite to the supporting ring tie 12 and this is of importance in this invention since there is a consistant tendency for the pursing cable to ride on the seine ring surface opposite to the ring tie and of course this determines the abovementioned localization of wear on the ring due to the abraisive action of the pursing cable, and if an uneven number of apertures 26 are provided this wear oocurs at points circumferentially spaced between the apertures. More importantly, the seiner using this improved seing ring and suitable ring tie structure of his choice can shift such ring tie successively to the other apertures thus avoiding excessive wear of the seine ring at any one point and of course increase the useful life of the seine ring without or prior to repair.

Figure 1:
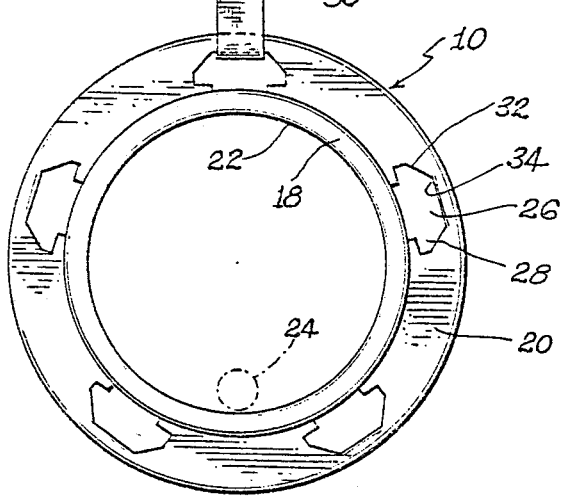
FIG. 1 is a front elevation of the seine ring with a pursing cable indicated in cross-section, a ring tie connected to the ring and a bridle shown fragmentarily.

Finally, the rounding of the edges of the seine ring as suggested in the drawing is desirable and can be increased considerably to give the seine ring a more nearly peak-like cross-sectional shape but a preferred shaping of the apertures 26 is that shown, namely, an aperture having a widened base portion 28 adjacent to the annulus 18 to facilitate the insertion of the ring tie such as the strap portion 30 of a ring tie 12, wrapped nylon cord, or the like. The inclined sides 32 of the apertures 26 guide the ring tie into the desired position as illustrated while allowing considerable play or twisting. The essentially flat rest 34 at the outer extremity of each aperture 26 is particularly suited to use with a strap type ring tie as illustrated in FIG. 1, but this seine ring is not limited to use therewith.

From the foregoing it will be clear how this seine ring is used with the claimed benefits of ease of handling, non-deformity and greatly increased useful life of the seine ring while retaining all the functions and advantages of conventional seine rings.

What I claim as new and desire to secure by Letters Patent, is:

1. The combination in a seine net assembly, comprising:

(a) a seine net having ring ties attached thereto;

(b) a pursing cable;

(c) a seine ring, in plurality, mounted on said pursing cable;

(d) each said seine ring being an internally recticylindrical annulus slidably mounted on said pursing cable, each annulus having radially outwardly extending portions having a plurality of means for connection therein selectively connected to one ring tie at points in said radially extending portions spaced circumferentially of said seine ring, so that cable wear on said annulus is distributed when said ring tie is connected to said means for connection at said points successively during use of the seine net assembly.

2. Structure according to claim 1 wherein said annulus has an internal cable-contacting face substantially flat in the direction of the axis of the annulus, thus presenting a large wear surface to the cable.

3. Structure according to claim 1 wherein said radially outwardly extending portions are parts of a continuous flange integral with said annulus, and said means for connection comprises a plurality of apertured portions of said flange selectively interconnectible with a ring tie.

4. Structure according to claim 3 wherein each of said apertured portions has an aperture with a widened base adjacent to said annulus and inclined sides leading to a rest for a ring tie at the radially outward extremity of the aperture to guide said ring tie into the desired position on said rest, while allowing easy insertion of said ring tie into said aperture and allowing play and twisting of the ring tie during manipulation of the seine net assembly during use.

5. Structure according to claim 4 wherein said rest is substantially flat to receive a ring tie of strap-like configuration.

* * * * *

UNITED STATES PATENT AND TRADEMARK OFFICE
CERTIFICATE OF CORRECTION

PATENT NO. : 4,380,882
DATED : April 26, 1983
INVENTOR(S) : Dominick J. Flammini It is certified that error appears in the above—identified patent and that said Letters Patent is hereby corrected as shown below:

Column 2, line 45, "peak-like" should read --pear-like--

Signed and Sealed this

Fifth Day of July 1983

[SEAL]

Attest:

Attesting Officer

GERALD J. MOSSINGHOFF
Commissioner of Patents and Trademarks